United States Patent [19]

Pariente

[11] 3,896,743

[45] July 29, 1975

[54] ASSEMBLY DEVICE FOR ELEMENTS CONSTITUTING FURNITURE AND FURNITURE COMPRISING SUCH DEVICES

[76] Inventor: Roger Pariente, 21 Blvd. du Montparnasse, 75006 Paris, France

[22] Filed: Dec. 10, 1973

[21] Appl. No.: 423,427

[30] Foreign Application Priority Data
Dec. 13, 1972   France .............................. 72.44271

[52] U.S. Cl. ................ 108/111; 211/177; 211/182; 312/263; 108/156
[51] Int. Cl............................................ A47b 47/04
[58] Field of Search ............ 108/111, 60, 153, 156; 211/148, 182, 177; 312/257, 263, 111, 108

[56] References Cited
UNITED STATES PATENTS

| | | | |
|---|---|---|---|
| 3,181,923 | 5/1965 | Guillon et al. ................... | 312/263 X |
| 3,186,561 | 6/1965 | Strassle .............................. | 211/182 |
| 3,250,584 | 5/1966 | Tassell ............................ | 312/111 X |
| 3,259,079 | 7/1966 | Freeman ............................. | 108/111 |
| 3,314,551 | 4/1967 | Plastow ............................ | 211/178 R |
| 3,525,560 | 8/1970 | Gasner............................. | 312/263 X |
| 3,661,434 | 5/1972 | Alster............................... | 312/257 R |
| 3,734,032 | 5/1973 | Kovacik ............................ | 108/111 |
| 3,747,885 | 7/1973 | Ciancimino..................... | 312/263 X |
| 3,747,965 | 7/1973 | Wing................................ | 211/177 X |

Primary Examiner—Francis K. Zugel
Attorney, Agent, or Firm—Morse, Altman, Oates & Bello

[57] ABSTRACT

An assembly device for assembling the constituents of a piece of furniture. It comprises a first element over at least a portion of which is provided a groove whose cross-section is at least partially circularly shaped and which emerges on the lateral surface of the element in a slot whose width is less than the diameter of said circle and at least a second element such as a bar, a ball or the like whose shape matches that of said groove, and which is adapted to cooperate with said groove when inserted therein at one extremity of the first element.

4 Claims, 19 Drawing Figures

PATENTED JUL 29 1975 3,896,743
SHEET 1

PATENTED JUL 29 1975 3,896,743

SHEET 2

PATENTED JUL 29 1975　　3,896,743

SHEET 3

ASSEMBLY DEVICE FOR ELEMENTS CONSTITUTING FURNITURE AND FURNITURE COMPRISING SUCH DEVICES

The present invention relates to an assembly device, particularly for assembling elements to constitute furniture as well as the furniture obtained by using such devices.

It is a general object of the invention to provide a device for assembling elements intended to constitute a piece of furniture such as uprights, shelves or shelf racks, doors, sliding panels, etc., enabling the simple construction, without using any particular tool of a piece of furniture such as a cupboard, a bookcase, but also a chair, armchair or similar article.

It is also an object of the invention to provide such a device which, not only enables the production of assemblies affording sufficient mechanical strength, but also, despite its simplicity and the fact that it can be installed by non-specialists, endows the furniture using it with aesthetic qualities that enhance its attractiveness.

The assembly device according to the invention is characterized in that it includes a first element over at least one portion of which is provided a groove emerging on the lateral surface of the element in a slot the width of which is less than the maximum circular cross-section of the groove, as well as at least a second element having a shape matching that of the groove, adapted to cooperate therewith, such as a ball, rod or the like which, when inserted into the groove at one extremity thereof, cannot escape through the slot.

The invention will be clearly understood from the following description given by way of example and with reference to the attached drawings wherein:

FIG. 12 illustrates the use of a device according to the invention for attaching a piece of furniture to a wall or the like;

Figure 18:
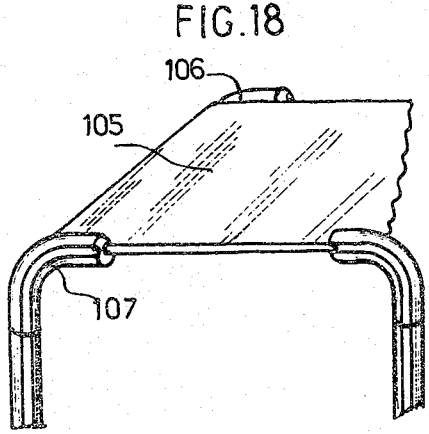

FIG. 18 diagrammatically represents another embodiment of the other portion of the piece of furniture comprising devices according to the invention.

In order to assemble the constituents of a piece of furniture, such as uprights, shelves, racks, doors, sliding panels, seat backs, etc., the invention proposes an assembly device comprising a first element 10 (FIG. 1), composed of wood, plastic, metal or any other material, rectilinear in the example given, but which can naturally be of any other geometric form, in which is provided a groove 11 running longitudinally of the element. The groove emerges on the lateral surface 13 of the element in a slot 14 whose width is less than the maximum cross-section of the groove which forms part of a circle 12.

A second element of the assembly device, whose shape matches that of groove 11, for example a rod 15 (FIG. 6), having a diameter substantially equal to that of the circular portion of the cross-section of element 10 which, when inserted into groove 11 by one extremity of element 10, cannot escape groove slot 14.

The elements or elements cooperating with groove 11 can also be constituted by balls 16 whose diameter corresponds to that of groove 11, or again by a spherical portion 17 whose diameter corresponds to that of groove 11 and which is separated from a bar or rod 18 with which it is made integral by means of a collar 19.

Alternatively, the element or elements cooperating with groove 11 are constituted by cylindrical rod sections 15a integral with a bar 15b, or again by balls 16a, attached for example by means of threated rods to a rod 16b.

Figure 2:
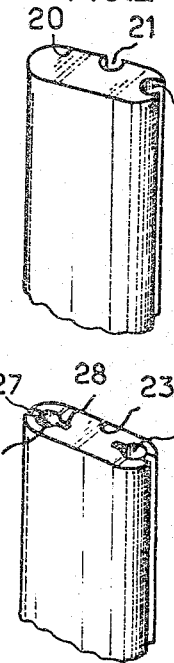
FIG. 2 is a perspective view of another form of embodiment of the element represented in FIG. 1.

In another embodiment of the first element of the device according to the invention, (FIG. 2), this device is a bar having an elliptical cross-section 20 comprising two grooves 21 and 22 with the same structure as groove 11 of element 10, and which are advantageously provided in perpendicular planes, for example those having the large and small axes of the ellipse.

Figure 5A:
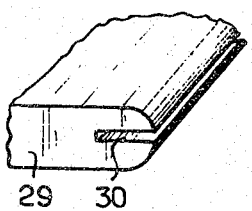
FIGS. 5a and 5b illustrate a method for manufacturing the element represented in FIG. 3.
Figure 5B:
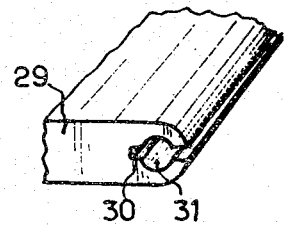
Figure 7:
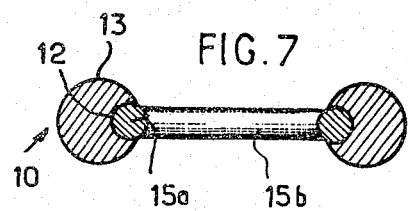
FIG. 7 is a cross-section of the device represented in FIG. 6, after assembly.

In yet another embodiment, (FIG. 3), the first element of the device according to the invention also has an elliptical cross-section 23 and comprises two grooves 25 and 26, substantially aligned in the same plane, for example that of the greater axis of the ellipse. Each of the grooves is shaped so as to comprise, opposite the slot, such as 27, through which groove 25 emerges on the lateral surface of the element, a recessed portion 28, having the same width as slot 27. Such an element can be obtained as diagrammatically represented in FIGS. 5a and 5b, i.e. by providing first in an element 29, on one end face, a slot 30, for example by means of a cylindrical reamer when element 29 is of wood, then by producing groove 31 using a spherical reamer.

In the case of a metallic, plastic or similar element, the latter can advantageously by obtained by moulding or profiling using a suitable matrix.

The shape and dimensions of the first element of the assembly device according to the invention can be selected as desired both in order to obtain the aesthetic appearance required and in order to interconnect, by means of a single device, several constituent portions of an assembly, for example a piece of furniture.

Figure 1:
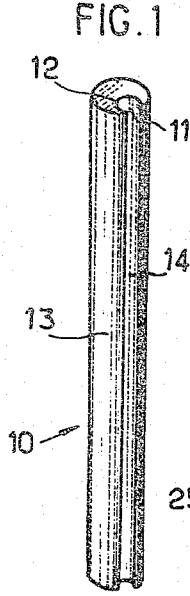
FIG. 1 is a perspective view of a first form of embodiment of an element of the device according to the invention.
Figure 3:
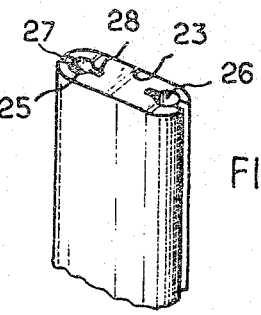
FIG. 3 is a view of yet another form of embodiment of such an element.
Figure 4:
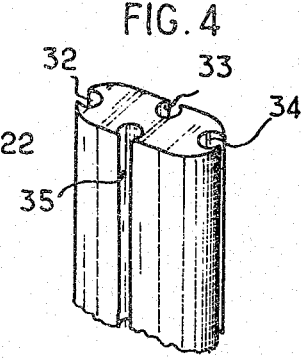
FIG. 4 is a view analogous to the previous one, but for yet another form of embodiment.

Thus, as represented in FIG. 4, such an element can be produced in the form of a rod or bar having a generally elliptical cross-section in which are provided four grooves 32, 33, 34 and 35 extending longitudinally of the element and each analogous in constitution to a groove 11 of element 10 in FIG. 1 or a groove 26 of the element in FIG. 3, said grooves being placed two by two in perpendicular planes, advantageously orientated along the large and small axes of the element cross-section.

Figure 8:
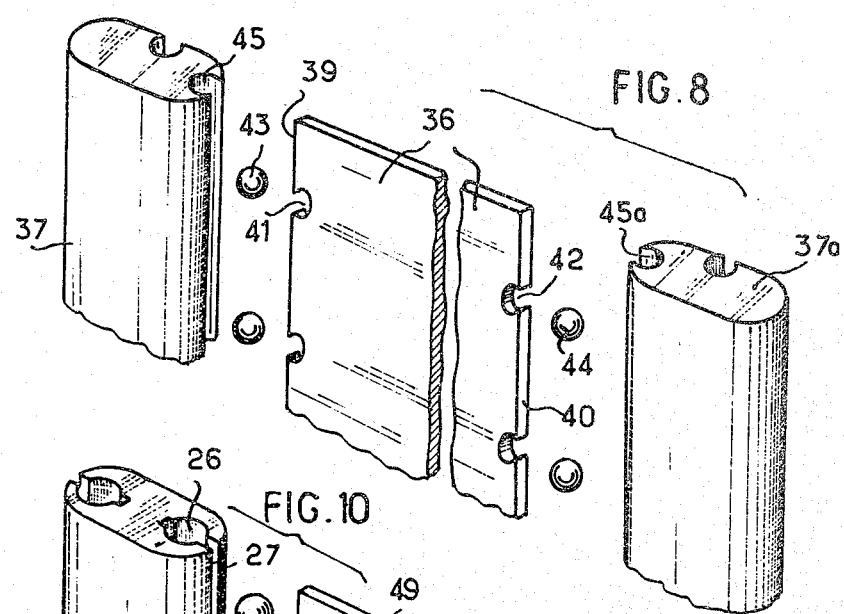
FIG. 8 illustrates the erection of a furniture element, such as a panel, a pane or the like, by means of a device according to the invention.

A device according to the invention makes it possible to produce simply, without using any particular tool, a piece of furniture such as a bookcase, whose elements of the type represented in FIGS. 1 to 4, can constitute vertical members or horizontal cross-members; thus, FIG. 8 illustrates the method of mounting a panel 36 between two uprights 37 and 37a. On two opposite edges 39 and 40 of panel 36, which can for example be a glass plate, are provided perforations such as 41 and 42 whose contour forms part of a circle and in which balls such as 43 and 44 are suitable for housing, said balls when inserted in grooves 45 and 45a of uprights 37 and 37a, enabling plate or panel 36 to slide longitudinally of said upright.

Figure 10:
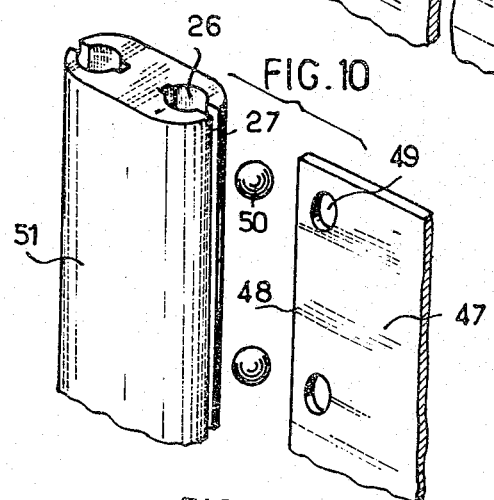
FIG. 10 is a view analogous to that of FIGS. 8 and 9, but for yet another form of embodiment.

In another embodiment, (FIG. 10), in which the thickness of panel 47 is slightly less than the width of slot 27 of an element of the type represented in FIG. 3, holes 49 are pierced adjacent to edge 48 of panel 47 to receive balls 50 which, when housed in groove 26 of upright 51, enable the panel to slide easily along said upright.

Figure 6:
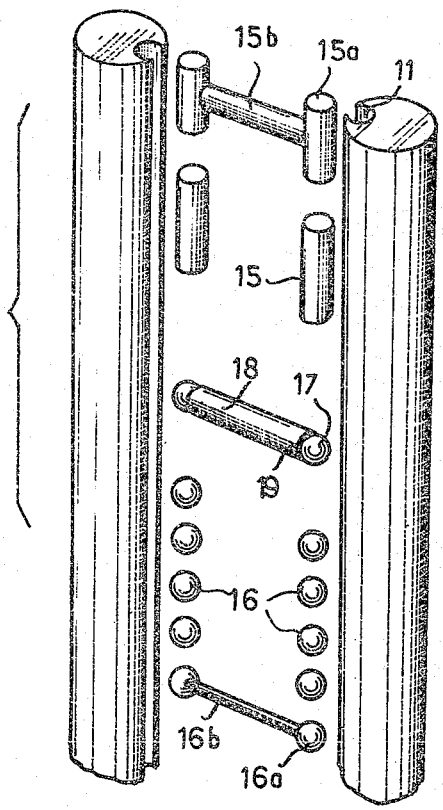
FIG. 6 is an exploded view of a device according to the invention for various forms of embodiment of elements suitable for cooperating with any one of the elements represented in FIGS. 1 to 4.
Figure 12:
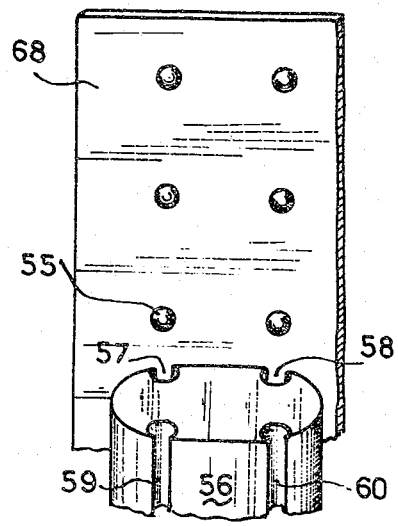

The device according to the invention can also be used, for example, to produce a shelved piece of furniture to be applied and maintained against a wall or partition. For such an application, it is possible (FIG. 12) to attach balls 55 by means of screws to the wall or partition and cause these balls to cooperate with grooves such as 57 and 58 of an upright 56 in which are also provided grooves 59 and 60 into which elements of the type represented in FIG. 6 are suitable for insertion. In such an embodiment, the aspect of the furniture can advantageously be enhanced by providing for balls such as 55 to be made integral with an end panel 58 itself attached to the wall or partition by any appropriate means.

Figure 11:
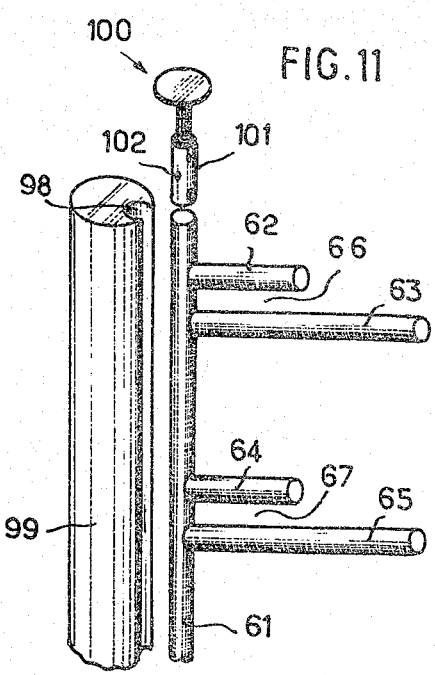
FIG. 11 represents an element of the device according to the invention suitable for cooperating with any one of the elements represented in FIGS. 1 to 4.

In a embodiment of a shelved piece of furniture which is not to be made integral with a wall or partition, the invention provides for causing the groove or grooves such as 98 to cooperate with an upright 99 of the elements of the type represented in FIG. 11, i.e. a rectilinear bar 61 whose cross-section matches that of grooves 98, and from which extend perpendicular to the direction of the bar pairs of rod such as 62-63, 64-65, etc. of unequal length defining between them spaces 66, 67 etc. for receiving plates or shelf racks. In order to maintain the piece of furniture, for example by means of a member bearing against the floor or the ceiling, bars 61 are advantageously combined with jack means 100, most simply of the screw type, whose manipulating member 101 comprises perforations such as 102 by which it can be actuated, through the slot in which groove 98 emerges in upright 99, when means 100 are inserted in said groove.

Figure 13:
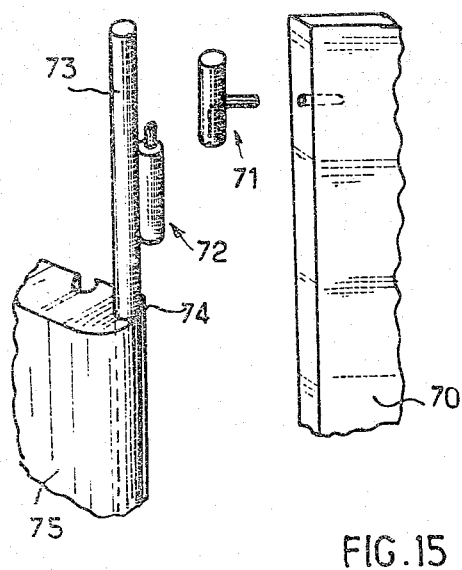
FIG. 13 illustrates the use of a device according to the invention for mounting a door.

The invention is in no way limited to the production of furniture having uprights and shelving and/or sliding panels. It also applies, as represented in FIG. 13, to the production of furniture comprising doors, such as bars and cupoards and, in this case, it provides for attaching to the leaf of a door a hinge member 71 whose other member 72 is integral with a rod 73 suitable for cooperating with the groove 74 of an upright 75.

Figure 16:
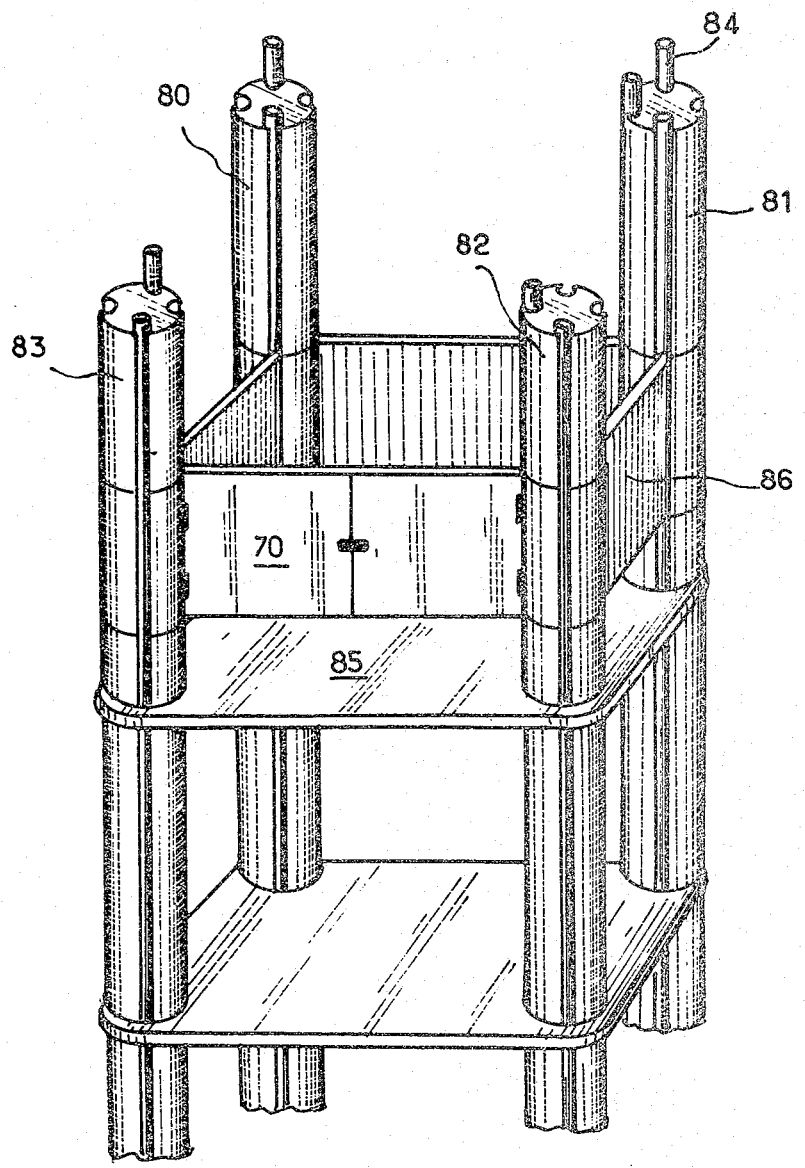
FIG. 16 is a perspective view of a piece of furniture obtained using devices according to the invention.

In this way, a complete piece of furniture can be produced using prefabricated elements, as represented in FIG. 16.

Figure 9:
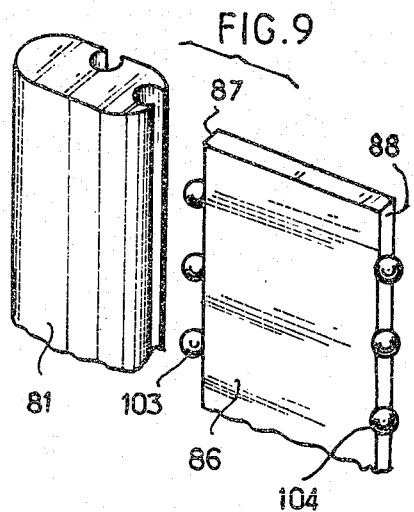
FIG. 9 is a view similar to that of FIG. 8, but for another form of embodiment.
Figure 14:
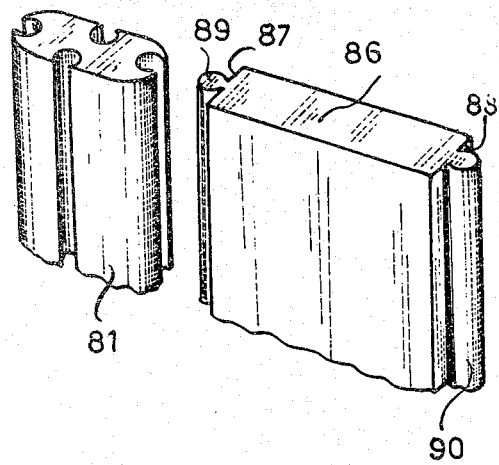
FIG. 14 represents a portion of a piece of furniture obtained using a device according to the invention.

In such a piece of furniture, uprights 80, 83 which are disposed at the corners of a rectangle can be constituted by means of sections of elements of the type represented in FIG. 4 which are interconnected by introducing into the grooves these bar sections such as 84 having a circular cross-section matching that of said groove. The latter also serve to assemble doors 70 using the means represented in FIG. 13, it being possible for these doors to be interposed between two horizontal plates such as 85, simply constituted by a shelf with a suitable contour, the corners of which are pierced by holes admitting assembly bars 84. The lateral walls, such as 86, which define, together with doors 70, the lateral wall of the volume to which said doors give access, are advantageously assembled as represented in FIGS. 9 and 14 i.e. either by providing ribs 89 and 90 having a cross-section matching that of the grooves of uprights 81 and 82 on two end faces 87 and 88 of panels 86, or by fitting onto end faces 87 and 88 of panel 86 balls 103 and 104 whose diameter matches that of the grooves of uprights 81 and 82.

Figure 15:
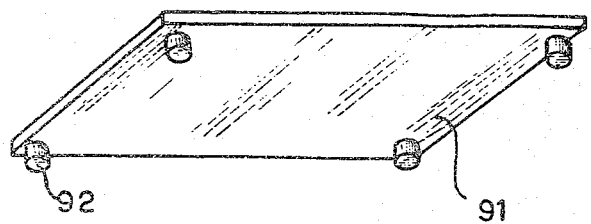
FIG. 15 represents means for attaching the top of a piece of furniture including devices according to the invention.

In order to constitute the top of the piece of furniture, a panel 91 (FIG. 15) is provided and at the corners of said panels are attached pegs such as 92 whose cross-section matches that of uprights 81-83 and which are suitable for cooperating therewith.

Alternatively, the top 105 of the furniture is introduced into the grooves, such as 106, of angle brackets 107 which are either built onto uprights 80-83, or are integral therewith when said uprights are of metal or plastic and, consequently, can be bent or shaped on moulding to match the rest of the uprights.

Figure 17:
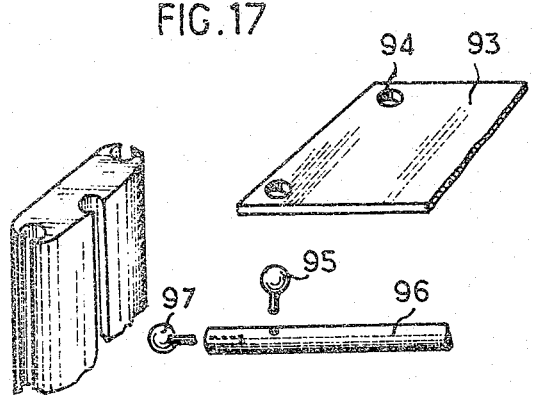
FIG. 17 illustrates an alternative means of obtaining a piece of furniture by means of devices according to the invention.

In one embodiment, (FIG. 17), the shelves such as 93 designed to form certain members of the furniture, have their corners pierced by circular holes 94, and balls or cylindrical studs 96 are suitable for cooperating therewith, said balls or studs being attached by any suitable means, for example by screwing, to a bar 96 having a square, rectangular or round cross-section designed to serve as a support, and at whose extremities are attached, for example by screwing, balls such as 97 suitable for cooperating with the grooves of the furniture uprights.

The invention is in no way limited to the modes of execution illustrated, but can be carried out in various other forms.

Thus, for example, a piece of furniture, such as a chair or armchair, can also be constructed with its cross-bracing constituted by elements such as those represented in FIGS. 1 to 4, and whose back is constituted by mounting in a U shaped frame whose arms comprise grooves, short rectilinear bars attached to strips or bars whose length is substantially that between the arms of the frame.

I claim:
1. A piece of furniture, comprising in combination
   a. a plurality of parallel posts adapted to provide vertical support for said piece of furniture,
   b. at least one panel adapted to be mounted in a horizontal position to said posts and supported thereby,
   c. said panel being formed with at least one opening at each post,
   d. each post comprised of at least two coaxially aligned portions of similar cross-section, one portion on each side of each of said panels,
   e. the cross-sectional dimension of each portion being greater than that of said opening,
   f. each portion being formed with a plurality of parallel longitudinal grooves C-shaped in cross-section,
   g. an elongated solid cylindrical rod mounted in at least one groove of all portions of each post to join said portions, said rod passing through the opening at each post, and
   h. at least one wall mounted vertically between a pair of said posts,
   i. said wall being formed with connecting elements along opposite edges thereof and of circular cross-section for engagement with grooves in said posts.

2. A piece of furniture according to claim 1 including a door hinged to at least one of said posts at one of said grooves.

3. A piece of furniture according to claim 1 including a screw jack mounted in the end of a groove for each post for changing the effective length thereof.

4. A piece of furniture according to claim 1 including a planar slide panel formed with a plurality of arcuate openings along opposing margins thereof and a spherical member mountable in each of said slide panel opening and in grooves of a pair of posts for slidably locking said slide panel to said pair of posts.

* * * * *